United States Patent [19]

Bruder et al.

[11] 3,747,334
[45] July 24, 1973

[54] COMPACT MULTIPLE-SHAFT RE-EXPANSION GAS TURBINE ENGINE WITH HEAT EXCHANGERS

[75] Inventors: Werner Bruder, Neckarrems; Hubert Grieb, Stuttgart; Eberhard Tiefenbacher, Ludwigsburg, all of Germany

[73] Assignee: Daimler-Benz Aktiengesellschaft, Stuttgart, Germany

[22] Filed: June 3, 1971

[21] Appl. No.: 149,542

[30] Foreign Application Priority Data

June 3, 1970 Germany.............P 20 27 221.3

[52] U.S. Cl. ............................ 60/39.17, 60/39.51 R
[51] Int. Cl. .............................................. F02c 1/06
[58] Field of Search................... 60/39.16, 39.51 H, 60/39.51 R, 39.17

[56] References Cited
UNITED STATES PATENTS

| 3,204,406 | 9/1965 | Howes et al. | 60/39.17 |
| 3,457,877 | 7/1969 | Ostermeyer | 60/39.16 |
| 3,324,655 | 6/1967 | Kaplan | 60/39.17 |
| 3,609,966 | 10/1971 | Guillot | 60/39.17 |
| 2,811,302 | 10/1957 | Hodge et al. | 60/39.16 |
| 3,659,417 | 5/1972 | Grieb | 60/39.18 C |

FOREIGN PATENTS OR APPLICATIONS

| 964,566 | 7/1964 | Great Britain | 60/39.16 |

*Primary Examiner*—Carlton R. Croyle
*Assistant Examiner*—Warren Olsen
*Attorney*—Craig, Antonelli & Hill

[57] ABSTRACT

A gas turbine engine, especially for vehicles which includes a low pressure compressor unit, a high-pressure compressor unit, a heat-exchanger unit, a combustion chamber unit, a compressor turbine unit and a work turbine unit, in which these units are divided into at least two sections adjacent one another, preferably with parallel axes, whereby the heat-exchanger unit is so arranged that its feed pipe or pipes are disposed parallel to the axes.

32 Claims, 2 Drawing Figures

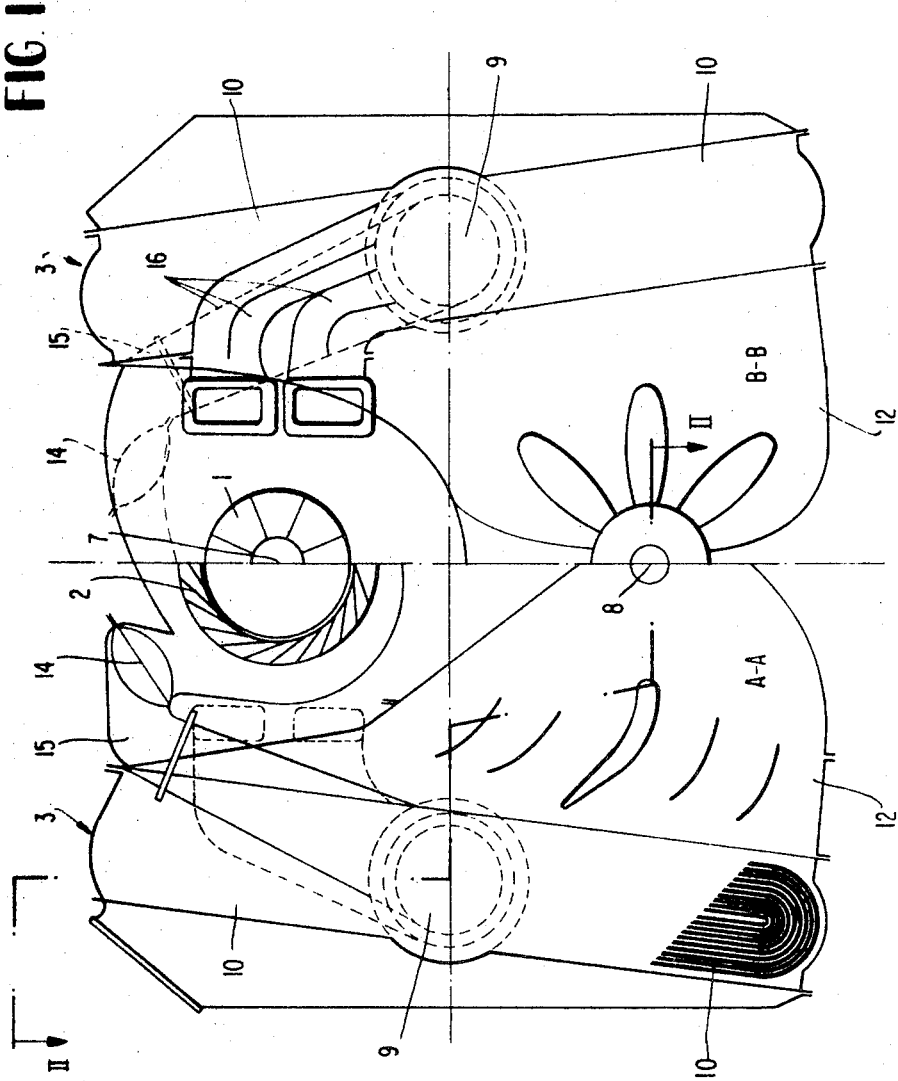

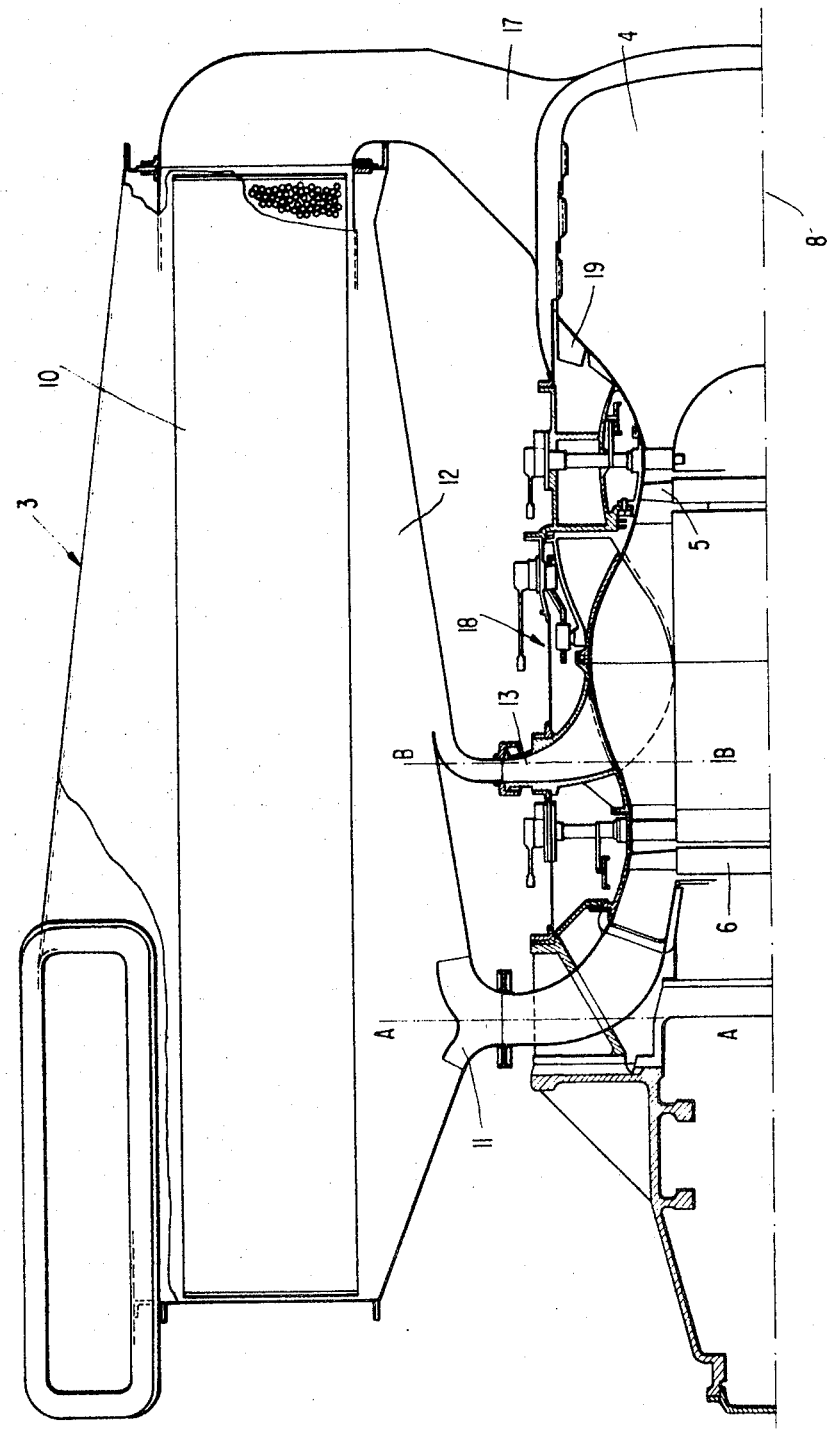

COMPACT MULTIPLE-SHAFT RE-EXPANSION GAS TURBINE ENGINE WITH HEAT EXCHANGERS

The present invention relates to a gas turbine engine, especially for vehicles, with a low-pressure compressor unit, a high-pressure compressor, a heat-exchanger unit, a combustion chamber unit, a compressor turbine unit and a work or output turbine unit with associated speed-reduction gear.

In the known gas turbines or gas turbine engines all of the aforementioned aggregates or units are arranged axially one behind the other in one direction. Consequently, these prior art gas turbines involve a large space requirement so that their installation into vehicles offers difficulties already for that reason. Additionally, difficulties are encountered in aligning all aggregates or units accurately with respect to each other and in providing a good centering for all of the parts. Also, the lubrication which has to be undertaken at numerous places spaced far from one another, offers considerable difficulties in the prior art constructions.

The present invention is concerned with the task to avoid these disadvantages and to provide a gas turbine of the aforementioned type which is characterized above all by a very compact construction so that it is suited in particular for vehicles.

The present invention essentially consists in that the aggregates or units are divided at least into two sections disposed adjacent one another, preferably having parallel axes, and in that the heat-exchanger is so arranged that the supply pipe or pipes are disposed parallel to the axes of the sections whereas the matrices extend approximately parallel to the plane which is defined by the axes of these aggregates. An extraordinarily compact gas turbine is realized by such an arrangement in which also the heat-exchanger does not require any unnecessary increase in the structural volume.

It may be advantageous in connection with certain types of constructions if the supply pipe or pipes are arranged in the center above the aggregates and the matrices cover the aggregates in a roof-shaped manner. The advantage can be realized thereby that the gases discharged by the output turbine and/or the compressor turbine can flow off in the upward direction. A particularly favorable embodiment of the present invention, however, is obtained if a supply pipe with a matrix is arranged on each side of the aggregates or units disposed one above the other, which are connected with each other by lines arranged at the end face of the drive unit. With this type of construction, the shortest possible channels or ducts from and to the heat-exchanger can be realized so that the heat losses can be kept extraordinarily small. It is particularly advantageous if the feed pipes are disposed approximately at half height of the assembly and are provided with upwardly and downwardly directed matrices.

In a structurally advantageous manner, the outlets of the compressor turbine and output turbine adapted to be selectively connected in series or in parallel, may be connected with the heat-exchanger by way of lateral feed channels or ducts which extend over the entire height and width of the matrices. By the use of such a construction, the hot exhaust gases can be fed to the heat-exchanger over very short paths so that hardly any significant losses result.

It is also advantageous if the combustion chamber unit is arranged on a common axis with the compressor turbine unit and output turbine unit approximately between the supply or feed pipes of the heat-exchanger and the flow takes place from both sides.

Accordingly, it is an object of the present invention to provide a gas turbine, especially for vehicles, which avoids by simple means the aforementioned shortcomings and drawbacks encountered in the prior art.

Another object of the present invention resides in a gas turbine which excels by an extraordinarily compact design, permitting ready installation in a vehicle while avoiding difficulties as regards accurate alignment and correct centering of its various parts.

A further object of the present invention resides in a gas turbine, especially for vehicles, which facilitates the lubrication of the various units while minimizing heat losses due to unnecessarily long ducts.

These and further objects, features and advantages of the present invention will become more obvious from the following description when taken in connection with the accompanying drawing which shows, for purposes of illustration only, one embodiment in accordance with the present invention, and wherein:

FIG. 1 is a somewhat schematic cross-sectional view of the heat-exchanger of a gas turbine according to the present invention, which is composed of several partial cross sections; and FIG. 2 is a schematic longitudinal cross section through the heat-exchanger and through a part of the turbine aggregate of FIG. 1, taken along line II—II of FIG. 1.

For further details of a shifting installation for series and parallel flow operation, see commonly assigned copending appliation Ser. No. 149,699, filed June 3, 1971 and for further details of the gearing and flow paths between the engine units, see commonly assigned copending application Ser. No. 149,544, filed June 3, 1971.

Referring now to the drawing wherein like reference numerals are used throughout the two views to designate like parts, the gas turbine illustrated in the drawing consists of an axial low-pressure compressor 1 (FIG. 1), of a radial high-pressure compressor 2, of a heat-exchanger generally designated by reference numeral 3, of a combustion chamber 4 (FIG. 2), of a compressor turbine 5 and of a work or output turbine 6 which has connected in its output a conventional speed-reduction gear (not shown). In this gas turbine, the two compressors 1 and 2 are arranged on a common axis 7 whereas the combustion chamber 4, the compressor turbine 5 and the work turbine 6 are arranged on a second axis 8 disposed therebelow. In addition to the avoidance of manufacturing, machining and assembly difficulties, the advantage of an extraordinarily compact structural size of the gas turbine results from the arrangement according to this invention. In order not to have to increase this structural size by the necessary heat-exchanger 3, the heat-exchanger is so arranged that the two feed pipes 9 (FIG. 1) are disposed parallel to the axes 7 and 8 of the units whereas the matrices 10 are disposed approximately parallel to the plane which is defined by the axes 7 and 8 of the units. As a result thereof, the heat-exchanger 3 projects beyond the contours of the gas turbine defined by the turbo elements only in one direction; namely, in the direction of their width.

In FIG. 1, in the left lower quadrant of the drawing is illustrated the cross section A-A according to FIG. 2 through the outlet or discharge 11 of the output turbine 6 which is connected laterally to the heat-exchanger 3 by way of a supply or feed duct 12 which extends over the entire height and width of the two matrices 10 arranged one above the other.

In the right lower quadrant of FIG. 1 there is illustrated in this figure the section B-B of FIG. 2 through the outlet 13 of the compressor turbine which in case of a parallel connection of the gas turbine, terminates in the same supply duct 12 to the heat-exchanger 3.

In the upper left quadrant, FIG. 1 illustrates a cross section through the outlet 14 of the high-pressure compressor 2 of the gas turbine, whose spiral housing is connected by way of a pipe 15 with the supply pipe 9 of the heat-exchanger 3. One pipe 15 each, branching off from the spiral housing, is thereby provided for the supply or feed pipes 9 arranged on both sides at approximately half height.

In the upper right quadrant, FIG. 1 illustrates a cross section through the outlet of the axial low-pressure compressor 1 whose outlet channels or ducts 16 also lead to the two feed pipes 9.

The longitudinal cross section according to FIG. 2 illustrates how close the matrices 10 and the feed pipes 9 are arranged laterally at the compressor turbine 5 and the output turbine 6 and what relatively short feed paths of the hot exhaust gases are only necessary. As further illustrated in FIG. 2, a combustion chamber 4 is connected upstream of the compressor turbine 5 which is arranged on the same axis 8 as the compressor turbine 5 and the output turbine 6. Air is supplied to the combustion chamber 4 from the two supply pipes 17 from two sides, which pipes are disposed approximately at the same height.

Additionally, a shifting element 18 can be seen in FIG. 2 which is operable to connect the compressor turbine 5 and the output turbine 6 either in parallel or in series. In the parallel operation, the compressor turbine 5 is separated with respect to the working or output turbine 6 whereas its outlet duct 13 is opened so that it gives off the exhaust gases directly to the heat-exchanger 3. Simultaneously therewith, the output turbine 6 is connected by way of the shifting element 18 with an auxiliary inlet 19 of the combustion chamber 4 so that also the output turbine 6 is fed directly with the gas from the combustion chamber 4.

In the illustrated position of the shifting element 18, the series connection of compressor turbine 5 and output turbine 6 is established. This means that the auxiliary inlet 19 is closed and the gases leaving the combustion chamber 4 at first flow through the compressor turbine 5, then through the work turbine 6, and finally are conducted to the heat-exchanger 3. In addition to the auxiliary inlet 19, also the outlet duct 13 of the compressor turbine 5 is closed.

While we have shown and described only one embodiment in accordance with the present invention, it is understood that the same is not limited thereto but is susceptible of numerous changes and modifications as known to those skilled in the art. For example, in lieu of the arrangement of the heat-exchanger illustrated in the described embodiment, provision may also be made to arrange the feed pipes 9 in the center above the turbine aggregates and to let the matrices 10 cover the turbine aggregates roof-shaped. Also, such modified construction permits a space-saving construction. Consequently, we do not wish to be limited to the details shown and described herein but intend to cover all such changes and modifications as are encompassed by the scope of the appended claims.

What we claim is:

1. A compact arrangement of rotary units, combustion chamber, and heat exchanger means for a gas turbine engine of the type having a plurality of operatively interconnected rotary units including: low-pressure compressor means, high pressure compressor means, compressor turbine means and output turbine means; each of said rotary units having a turbo-unit axis and means rotatable about said rotary unit axis, said engine being divided into at least two sections with at least one of said rotary units in each section, each section having a longitudinally extending section axis which coincides with the rotary unit axes of the respective rotary units in said section, said section axes lying in a common plane and being spaced from and parallel to one another; wherein a combustion chamber unit operatively connected with said rotary units is arranged in one of said sections along the section axis thereof, wherein two heat exchanger units are arranged respectively at opposite sides of said common plane, each of said heat exchanger units including feed pipe means and heat exchanger matrix means, wherein said feed pipe means extend parallel to said common plane, and wherein said matrix means extends substantially parallel to said common plane, whereby particularly advantageous flow paths between the heat exchanger units and the other engine units are obtained simultaneously with a particularly compact positioning of the heat exchanger units and the other engine units.

2. An arrangement according to claim 1, wherein said gas turbine engine is installed in a vehicle, and wherein means are provided for operatively connecting the output turbine means to a speed reduction gear.

3. An arrangement according to claim 1, wherein said sections are arranged vertically above one another, and wherein said feed pipe means are arranged approximately midway between the top of the uppermost section and the bottom of the lowermost section.

4. An arrangement according to claim 3, wherein said matrix means include upwardly and downwardly extending matrix units connected to said feed pipe means.

5. An arrangement according to claim 1, wherein said high compressor means and said low compressor means are in a first of said sections, and wherein said compressor turbine means, said output turbine means, and said combustion chamber are in a second of said sections.

6. An arrangement according to claim 5, wherein means are provided for supplying air to said combustion chamber at both sides of said common plane.

7. An arrangement according to claim 5, wherein compressor turbine lateral feed duct means are provided for communicating outlet means of said compressor turbine means with said matrix means of said heat exchanger means.

8. An arrangement according to claim 5, wherein output turbine lateral feed duct means are provided for communicating outlet means of said output turbine means with said matrix means of said heat exchanger means.

9. An arrangement according to claim 7, wherein output turbine lateral feed duct means are provided for communicating outlet means of said output turbine means with said matrix means of said heat exchanger means.

10. An arrangement according to claim 7, wherein said compressor turbine lateral feed duct means includes end portions at said respective matrix means which extend over the entire height and width of the matrix means.

11. An arrangement according to claim 8, wherein said output turbine lateral feed duct means are provided with end portions at said respective matrix means which extend over the entire height and width of the matrix means.

12. An arrangement according to claim 9, wherein each of said compressor turbine lateral feed duct means and said output turbine lateral feed duct means include end portions at said respective matrix means which extend over the entire height and width of the matrix means.

13. An arrangement according to claim 12, wherein said first and second sections are arranged one above the other, and wherein said feed pipe means are positioned approximately midway between the top of the upper of said sections and the bottom of the lower of said sections.

14. An arrangement according to claim 13, wherein said matrix means include upwardly and downwardly extending matrix units connected to said feed pipe means.

15. An arrangement according to claim 14, wherein said first section is above said second section.

16. An arrangement according to claim 15, wherein the feed pipe means are connected with one another by lines arranged at the end face of the engine.

17. An arrangement according to claim 13, further comprising shifting means for selectively shifting the gas flow through said rotary units between series operation and parallel operation of said engine, wherein said low and high compressor means are interconnected with output flow from said low compressor means being supplied as input flow to said high compressor means during series operation, and wherein the input flow to said high compressor means is separate from the output flow from said low compressor means during parallel operation.

18. An arrangement according to claim 5, further comprising shifting means for selectively shifting the gas flow through said rotary units between series operation and parallel operation of said engine, wherein said low and high compressor means are interconnected with output flow from said low compressor means being supplied as input flow to said high compressor means during series operation, and wherein the input flow to said high compressor means is separate from the output flow from said low compressor means during parallel operation.

19. An arrangement according to claim 1, further comprising shifting means for selectively shifting the gas flow through said rotary units between series operation and parallel operation of said engine, wherein said low and high compressor means are interconnected with output flow from said low compressor means being supplied as input flow to said high compressor means during series operation, and wherein the input flow to said high compressor means is separate from the output flow from said low compressor means during parallel operation.

20. A compact arrangement of turbo-units, combustion chamber, and heat exchanger means for a gas turbine engine of the type having a plurality of operatively interconnected rotary units including: low-pressure compressor means, high pressure compressor means, compressor turbine means and output turbine means; each of said rotary units having a rotary unit axis and means rotatable about said rotary unit axis, said engine being divided into at least two sections with at least one of said rotary units in each section, each section having a longitudinally extending section axis which coincides with the rotary unit axes of the respective rotary units in said section, said section axes lying in a common plane and being spaced from and parallel to one another; wherein a combustion chamber unit operatively connected with said rotary units is arranged in one of said sections along the section axis thereof, wherein two heat exchanger units are arranged respectively at opposite sides of said common plane, each of said heat exchanger units including feed pipe means and heat exchanger matrix means, wherein said feed pipe means extend parallel to said common plane, and wherein said matrix means extend in a plane inclined to said common plane such that the matrix plane intersects the common plane at a line spaced above all of said sections, whereby particularly advantageous flow paths between the heat exchanger units and the other engine units are obtained simultaneously with a particularly compact positioning of the heat exchanger units and the other engine units.

21. An arrangement according to claim 20, wherein said gas turbine engine is installed in a vehicle, and wherein means are provided for operatively connecting the output turbine means to a speed reduction gear.

22. An arrangement according to claim 20, wherein said sections are arranged vertically above one another, and wherein said feed pipe means are arranged approximately midway between the top of the uppermost section and the bottom of the lowermost section.

23. An arrangement according to claim 22, wherein said matrix means include upwardly and downwardly extending matrix units connected to said feed pipe means.

24. An arrangement according to claim 20, wherein said high compressor means and said low compressor means are in a first of said sections, and wherein said compressor turbine means, said output turbine means, and said combustion chamber are in a second of said sections.

25. An arrangement according to claim 24, wherein compressor turbine lateral feed duct means are provided for communicating outlet means of said compressor turbine means with said matrix means of said heat exchanger means.

26. An arrangement according to claim 25, wherein output turbine lateral feed duct means are provided for communicating outlet means of said output turbine means with said matrix means of said heat exchanger means.

27. An arrangement according to claim 26, wherein each of said compressor turbine lateral feed duct means and said output turbine lateral feed duct means include end portions at said respective matrix means which extend over the entire height and width of the matrix means.

28. An arrangement according to claim 27, wherein said first and second sections are arranged one above the other, and wherein said feed pipe means are positioned approximately midway between the top of the upper of said sections and the bottom of the lower of said sections.

29. An arrangement according to claim 28, wherein said matrix means include upwardly and downwardly extending matrix units connected to said feed pipe means.

30. An arrangement according to claim 29, wherein said first section is above said second section.

31. An arrangement according to claim 30, further comprising shifting means for selectively shifting the gas flow through said rotary units between series operation and parallel operation of said engine, wherein said low and high compressor means are interconnected with output flow from said low compressor means being supplied as input flow to said high compressor means during series operation, and wherein the input flow to said high compressor means is separate from the output flow from said low compressor means during parallel operation.

32. An arrangement according to claim 20, further comprising shifting means for selectively shifting the gas flow through said rotary units between series operation and parallel operation of said engine, wherein said low and high compressor means are interconnected with output flow from said low compressor means being supplied as input flow to said high compressor means during series operation, and wherein the input flow to said high compressor means is separate from the output flow from said low compressor means during parallel operation.

* * * * *